United States Patent [19]
Feigel et al.

[11] Patent Number: 5,779,326
[45] Date of Patent: Jul. 14, 1998

[54] ACTUATING UNIT FOR A LOCKING-PROTECTED MOTOR VEHICLE BRAKE SYSTEM

[75] Inventors: Hans-Jörg Feigel, Rosbach; Ulrich Neumann, Rossdorf; Lothar Schiel, Hofheim, all of Germany

[73] Assignee: ITT Automotive Europe GmbH, Germany

[21] Appl. No.: 492,015

[22] PCT Filed: Nov. 20, 1993

[86] PCT No.: PCT/EP93/03246

§ 371 Date: Sep. 14, 1995

§ 102(e) Date: Sep. 14, 1995

[87] PCT Pub. No.: WO94/16927

PCT Pub. Date: Aug. 4, 1994

[30] Foreign Application Priority Data

Jan. 20, 1993 [DE] Germany .............. 43 01 336.8

[51] Int. Cl.⁶ ..................................................... B60T 8/44
[52] U.S. Cl. .............................. 303/114.3; 303/113.3
[58] Field of Search ..................... 303/113.3, 114.3, 303/113.2

[56] References Cited

U.S. PATENT DOCUMENTS

| | | |
|---|---|---|
| 3,321,916 | 5/1967 | Cripe ........................... 303/114.3 |
| 4,767,165 | 8/1988 | Burgdorf ...................... 303/114.3 |
| 5,096,267 | 3/1992 | Volz . |
| 5,172,964 | 12/1992 | Levrai et al. ................. 303/114.3 |
| 5,181,769 | 1/1993 | Schiel et al. ................. 303/114.3 |
| 5,332,302 | 7/1994 | Maas . |

FOREIGN PATENT DOCUMENTS

| | | |
|---|---|---|
| 2 648 772 | 12/1990 | France . |
| 2 925 550 | 2/1980 | Germany . |
| 3 916 640 | 12/1990 | Germany . |
| 3 920 766 | 1/1991 | Germany . |
| 4 017 744 | 12/1991 | Germany . |
| 4 024 384 | 2/1992 | Germany . |
| 4 028 925 | 3/1992 | Germany . |
| 4 035 906 | 5/1992 | Germany . |
| 4 101 480 | 7/1992 | Germany . |
| 4 211 849 | 10/1993 | Germany . |
| 2 242 243 | 9/1991 | United Kingdom . |

*Primary Examiner*—Matthew C. Graham
*Attorney, Agent, or Firm*—Thomas N. Twomey; J. Gordon Lewis

[57] ABSTRACT

An actuating unit for a locking-protected motor vehicle brake system having a main brake cylinder and a vacuum brake booster arranged upstream of the main brake cylinder. The movable wall of the brake booster movable against the direction of actuation in the brake pressure control mode separately from the control housing by a pneumatic pressure equalization initiated within the booster housing.

19 Claims, 4 Drawing Sheets

ACTUATING UNIT FOR A LOCKING-PROTECTED MOTOR VEHICLE BRAKE SYSTEM

This application is the U.S. national-phase application of PCT International Application No. PCT/EP93/03246.

BACKGROUND OF THE INVENTION

The present invention pertains to an actuating unit, comprising a pneumatic brake booster, preferably a vacuum brake booster, as well as a main brake cylinder arranged downstream of the pneumatic brake booster, for a locking-protected motor vehicle brake system with a central electronic control unit, to the inputs of which output signals of sensors detecting the rotation behavior of the wheels to be braked are sent, wherein two pressure spaces, limited by at least two pistons, as well as a modulator space are provided in the main brake cylinder. The modulator space forms part of the first pressure space in the normal braking mode and can be connected to the wheel brakes in the brake pressure control mode separately from the first pressure space. The modulator space is limited by a modulator piston which is in force-transmitting connection with the movable wall of the brake booster and forms an outer part of the first primary piston which limits the first pressure space and is made of at least two parts. The other inner part of the modulator piston cooperates with an input member transmitting the actuating force of the brake booster to actuate a control valve which is arranged in a control housing and controls a pneumatic pressure difference acting on the movable wall.

Such an actuating unit is known, e.g., from DE-OS 41 01 480. In the brake pressure control mode, the necessary pressure modulation is performed by ventilating the vacuum chamber of the pneumatic brake booster which is otherwise connected to the vacuum source. An external pneumatic valve arrangement, which makes possible a connection between the vacuum chamber and the vacuum source or the atmosphere as a function of control signals of the central electronic control unit, is provided for this purpose.

The considerable reduction in the vacuum level, which occurs in the pressure control mode because of the interruption in the energy or vacuum storage taking place in the vacuum chamber, can be considered to be particularly disadvantageous in the prior art actuating unit. Relatively large surfaces, to which the pneumatic pressure difference can be admitted and which can be embodied only with a brake booster of tandem design, are therefore necessary within the brake booster housing. Especially the considerable size and the high manufacturing costs are felt to be disadvantageous in the case of a tandem brake booster. In addition, it is necessary to move large masses (e.g. the control housing), especially during operation.

Another disadvantage is that a high degree of opening of the atmospheric sealing seat is provided at the valve piston of the control valve in the control which leads to an unsatisfactory release behavior of the brakes and is considered to be another disadvantage.

The dimensioning of the vacuum chambers of the prior art actuating unit, which must be fairly small in order to achieve a rapid pressure build-up and rapid reduction in pressure in the brake pressure control mode, also is considered a disadvantage. However, the consequence of this is the absence of a vacuum reserve. The use of the above-mentioned pneumatic valve arrangement also causes additional costs, which adversely affect the price of the system.

DE-PS 29 25 550 discloses an actuating unit which is comprised of a vacuum brake booster and a main brake cylinder arranged downstream of the vacuum brake booster. The movable wall of the brake booster is arranged displaceably on and separately from the control housing via the intermediary of a spring.

The movable wall moves forward during the actuation of the brake booster, while the control housing remains in the starting position until it is carried by the movable wall due to its engagement with a radial collar provided on the control housing. This leads to poor meterability of the brake force in the initial area of actuation. The carrying of the control housing leads to an abrupt change in the pedal feel which is felt to be disturbing by the driver of the motor vehicle. In addition, means whose use would make possible the pressure modulation necessary in the brake pressure control mode within the framework of a locking-protected motor vehicle brake system are not provided in the prior-art actuating unit.

Finally, an actuating unit for locking-protected motor vehicle brake systems, which comprises a two-circuit main brake cylinder and a vacuum brake booster arranged upstream of the two-circuit main brake cylinder, is known from FR 2 648 772 A1. A valve piston actuating the control valve of the brake booster is designed as a two-part valve piston comprises a first piston part which is in force-transmitting connection with an input member and a second piston part which carries a sealing seat of the control valve and is guided sealed on the first piston part. An electromagnet which makes possible the actuation of the control valve, which actuation is independent from the driver's wish during a slip control, is arranged on the first piston part.

SUMMARY OF THE INVENTION

An object of the present invention is therefore to provide an actuating unit for a locking-protected motor vehicle brake system of the class described above which can be used at the same time as a central modulator unit in the case of a controlled braking process without the use of external pneumatic control valves. In addition, the design of the actuating unit, according to the present invention, shall make it possible to reduce the costs, the size and the weight. In addition, an improvement in the release times shall be achieved, and a sufficient vacuum reserve shall be guaranteed.

This object is achieved, according to the present invention, by the movable wall of the brake booster being able to be moved against the direction of actuation separately from the control housing in the brake pressure control mode by a pneumatic pressure equalization initiated within the booster housing. The object is achieved because only a small mass is to be moved in the brake pressure control mode, so that higher pressure gradients can be reached. At the same time, the deflection of the input member, relative to the control housing, and consequently the information of the driver's wish are preserved. Since only the degrees of triggering of the atmospheric sealing seat of the control valve which are usual in the normal braking mode occur in the control, favorable release behavior of the brakes is guaranteed. In addition, a more effective pressure modulation can be achieved with this type of triggering because the vacuum chamber of the brake booster continues to be connected to the vacuum source during the phase of pressure equalization, i.e., during the reduction in pressure in the modulator space and energy vacuum storage can take place. In addition, measures according to the present invention make possible a compact, integrated design of the actuating unit.

In a variant of the present invention, which can be manufactured at a particularly low cost, electromechanical means, which initiate the pressure equalization by reversing the control valve and prevent a change in the pneumatic pressure difference (i.e. the pneumatic pressure-holding phase), are provided. The electromechanical means are preferably formed by an electromagnet whose armature cooperates with a sleeve carrying a sealing seat (i.e. the atmospheric sealing seat) of the control valve. Such an electromagnet is highly suitable for this purpose, especially with respect to the forces to be applied.

A further increase in the reliability of operation is achieved in another embodiment of the present invention by the sleeve being axially in contact with the input member in a state pretensioned by the spring. This measure ensures that the sleeve is in contact with the input means even during very rapid actuation.

The above-mentioned pneumatic pressure-holding phase is embodied, according to another advantageous feature of the present invention, by overcoming the pretension of the spring and the frictional forces on the sleeve by energizing the electromagnet in the brake pressure control mode with a predeterminable energization level, so that the sleeve comes to lie on a valve body of the control valve, while the pretension of a valve spring, which brings the valve body into contact with the vacuum sealing seat of the control valve, is not overcome.

In an especially easy-to-assemble embodiment of the present invention, the electromagnet is arranged coaxially to and radially surrounding the input member in a cylindrical recess of the control housing facing the vacuum chamber of the brake booster.

Another advantageous embodiment of the present invention provides for the housing of the electromagnet to be designed conically in the pole area and cooperating with a truncated cone-shaped surface provided at the armature. This measure leads to a family of proportional force-versus-stroke characteristics, in which stronger forces are associated with the medium stroke range. Better conditions, especially higher tolerances for the individual phases of energization of the electromagnet, as well as weak forces in the stop area of the armature are guaranteed as a result. In addition, a reduction in the load on the material and in the noises occurring is achieved.

A further reduction in the manufacturing costs is made possible by the fact that the housing of the electromagnet is formed by a part manufactured according to the deep-drawing process and a radially inner cylindrical yoke, which is used to guide the armature, is provided. A low-friction film, which extends into the pole area of the housing, is arranged between the yoke and the armature. This measure leads to a reliably operating mounting of the armature which can be manufactured at low cost and contributes to the increase in the reliability of operation.

Finally, to achieve a further reduction in pressure in the modulator space to 0 bar, another embodiment of the present invention provides for the movable wall being able to perform an additional stroke beyond the released position in the brake pressure control mode. This measure results in a favorable effect, especially in control processes at low coefficient of friction.

Additional features and advantages of the present invention will appear from the following description of an exemplary embodiment of the present invention taken with the drawings.

DETAILED DESCRIPTION OF THE INVENTION

Identical components are designated by the same reference numbers in the figures.

Figure 1:
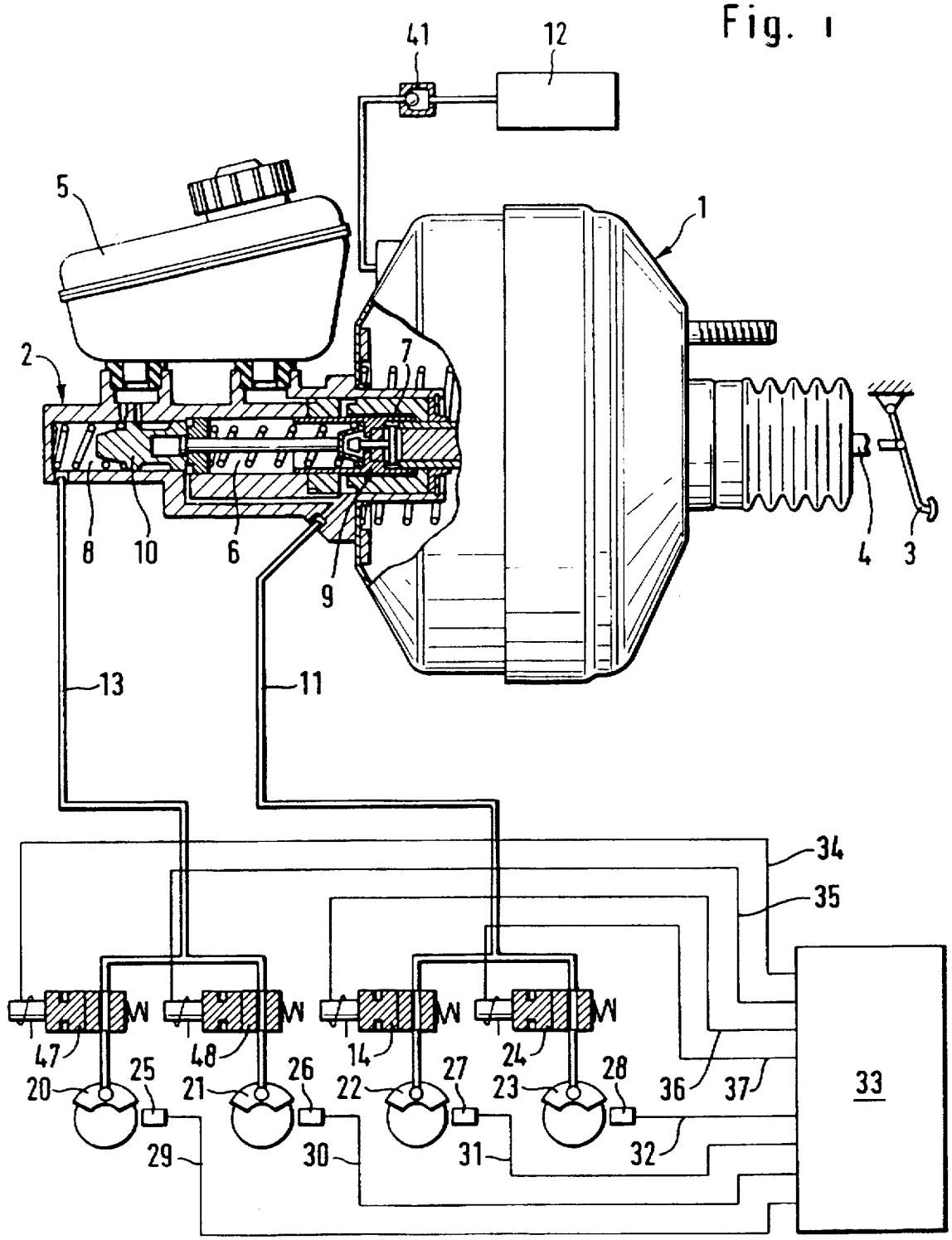
FIG. 1 shows a schematic representation of the locking-protected motor vehicle brake system according to the present invention.

FIG. 1 shows a locking-protected motor vehicle brake system with a vacuum brake booster 1 which is connected to a brake pedal 3 via an input member 4 in the known manner. A main brake cylinder 2, whose pressure spaces 6, 8 communicate with a pressurized medium reservoir 5, is provided on the side of the vacuum brake booster 1 facing away from the input member 4.

A first hydraulic line 11 connects the first (i.e. primary) pressure space 6, which is limited by a first main cylinder piston (i.e. primary piston) 9, to the wheel brake cylinders of two wheel brakes 22, 23, which are represented only schematically and may be associated with the rear axle, via two wheel valves 14, 24, which are designed as 2/2-way valves and are usually accommodated in a valve block.

The wheel brake cylinders of the two wheel brakes 20, 21, which are represented only schematically, are preceded by two additional wheel valves 47, 48, and are associated, e.g., with the front axle of the motor vehicle, are connected to the second (i.e. secondary) pressure space 8, which is limited by a second main cylinder piston (i.e. secondary piston) 10, by means of a second hydraulic line 13.

Respective sensors 25, 26, 27 and 28, which are connected to a central electronic control unit 33 via corresponding signal lines 29, 30, 31 and 32, are associated with the front and rear wheel brakes 20, 21, 22 and 23, respectively. The electronic control unit 33 is connected to the wheel valves 47, 48, 14, 24 via control lines 34, 35, 36 and 37, respectively, in order to actuate the wheel valves as a function of the sensor signals.

The main cylinder-side working (i.e. vacuum) chamber of the vacuum brake booster 1 is continuously connected to a vacuum source 12 via a check valve 41.

Figure 2:
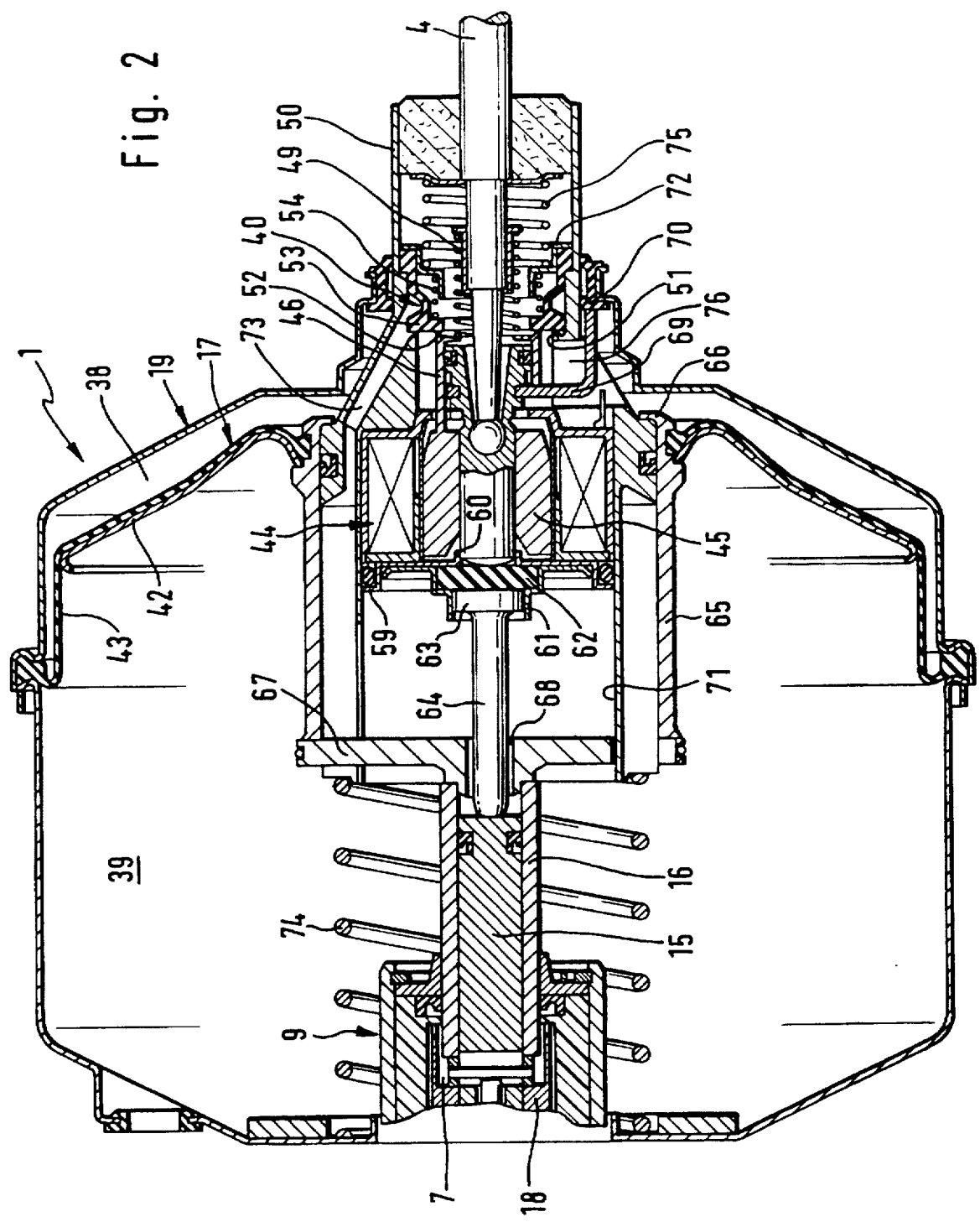
FIG. 2 shows a partially cutaway axial sectional view of the actuating unit according to the present invention used in the motor vehicle brake system according to FIG. 1 in the released position.

As can be seen, especially from FIG. 2, the first (primary) piston 9 limiting the first (primary) pressure space 6 is designed as a three-part piston. Piston 9 comprises an inner part 15 of a smaller diameter which is in force-transmitting connection with the input member 4 of the brake booster 1 (see FIG. 1); an outer part 16 of a larger diameter which forms a modulator piston cooperating with a movable wall 17 of the vacuum brake booster 1; and an intermediate piston 18 which limits, together with the modulator piston 16, an annular modulator space 7 which forms part of the first pressure space 6 in the normal braking mode and can be connected, separately from the first pressure space 6, to the wheel brakes 22, 23 in the brake pressure control mode (see FIG. 1).

The booster housing 19 of the brake booster 1 of the actuating unit, according to the present invention shown in the drawings, is divided by the axially movable wall 17 into a working chamber 38 and a vacuum chamber 39. The axially movable wall 17 comprises a deep-drawn diaphragm disk 42 made of sheet metal and a flexible diaphragm 43 which is in contact with diaphragm disk 42 and forms a rolling diaphragm acting as a seal between the outer circumference of the diaphragm disk 42 and the booster housing 19.

A control valve 40, which can be actuated by the input member or an actuating rod 4, is accommodated in a control housing 50, which is guided, sealed in an axial face seal 70, in the booster housing 19. Control valve 40 comprises a first or vacuum sealing seat 51 provided on the control housing 50; a second or atmospheric sealing seat 52 provided on a cylindrical sleeve 46 pretensioned by means of a spring 49; as well as a valve body 53 which cooperates with both sealing seats 51, 52 and is pressed against the sealing seats 51, 52 by means of a valve spring 54 supported by a retaining ring 72. The working chamber 38 can be connected to the vacuum chamber 39 via a channel 73 extending laterally in the control housing 50. The movable wall 17 is arranged separately from the control housing 50 on a force-transmitting sleeve 65 which is arranged axially displaceably on the control housing 50 and has a radial collar 66, which, being in axial contact with the control housing 50, makes possible the transmission of the boosting force to the control housing 50.

A resetting spring 74, which is supported on the vacuum-side front wall of the booster housing 19, holds the movable wall 17 in the starting position shown. In addition, a second compression spring 75, which is supported on the retaining ring 72 and whose force ensures the pretensioning of the atmospheric sealing seat 52 against the valve body 53, is provided.

Finally, to make it possible to connect the working chamber 39 to the atmosphere during the actuation of the control valve 40, an approximately radially extending channel 76 is provided in the control housing 50. The return movement of the input member 4 at the end of a braking process is now limited by a cross member 69 which is in contact with the axial face seal 70 forming a stop in the released position shown in the drawing.

To achieve a pressure-holding phase necessary during a control process during the triggering of the actuating unit according to the present invention, an electromagnet 44, whose armature 45 is in force-transmitting connection with the sleeve 46, is arranged in a cylindrical recess 71 of the control housing 50 opening into the vacuum chamber 39. The electromagnet 44, which is preferably arranged coaxially with the input member 4, is held in the recess 71 by means of an annular holding part 59 which is provided with a guide shoulder 60 to guide the front end of the input member 4. A centering ring 61, which has two sections 79, 80 of different diameter, is in axial contact with the holding part 59. A rubber-elastic reaction disk 62 transmits the initial force of the vacuum brake booster 1 and is arranged in the first section 79 with the larger diameter. The second cylindrical section 80 with the smaller diameter has a head flange 63 of a pressing rod 64. The diameter of the second section is slightly larger than the diameter of the guide shoulder 60. This measure guarantees that a narrow annular surface, which makes possible the transmission of part of the boosting force to the pressing rod 64, is limited on the reaction disk 62. An essentially larger portion of the boosting force to the outer or modulator piston 16 is transmitted by means of a force-transmitting plate 67 that is axially in contact with the force-transmitting sleeve 65. The force-transmitting plate 67 has in its center a cylindrical passage 68 through which the pressing rod 64, cooperating with the inner part 15 of the primary piston 9, extends.

Figure 3:
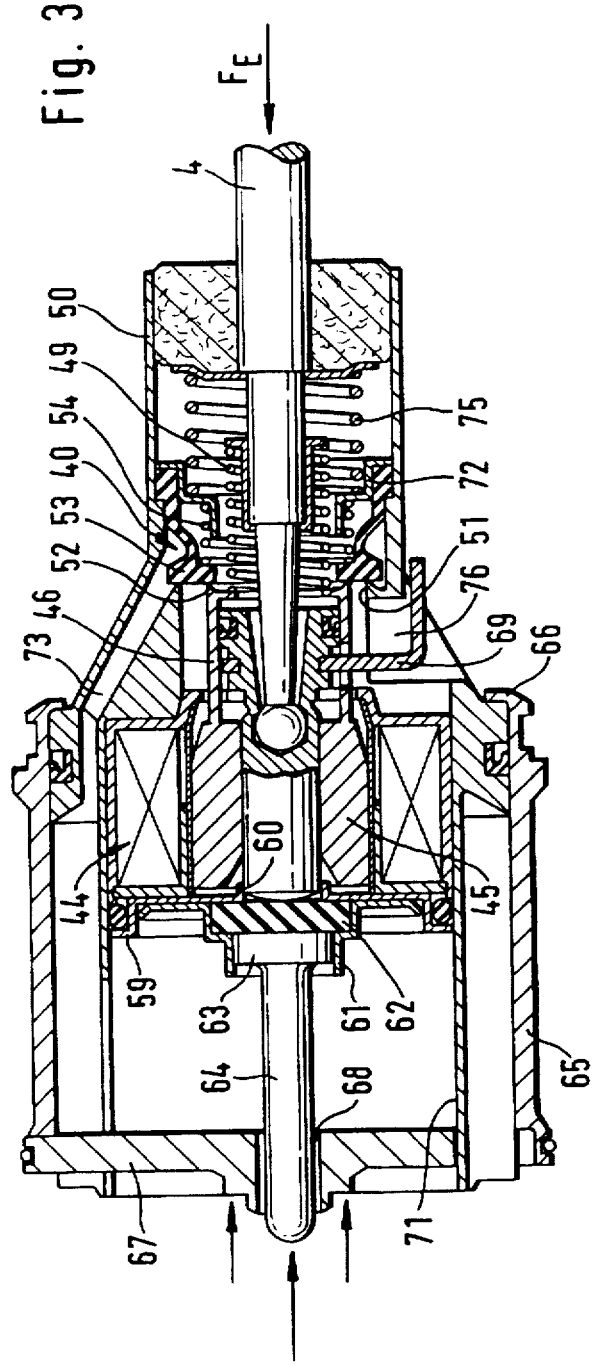
FIG. 3 shows a sectional view of pressure-holding of the actuating unit according to the present invention during a pressure control.
Figure 4:
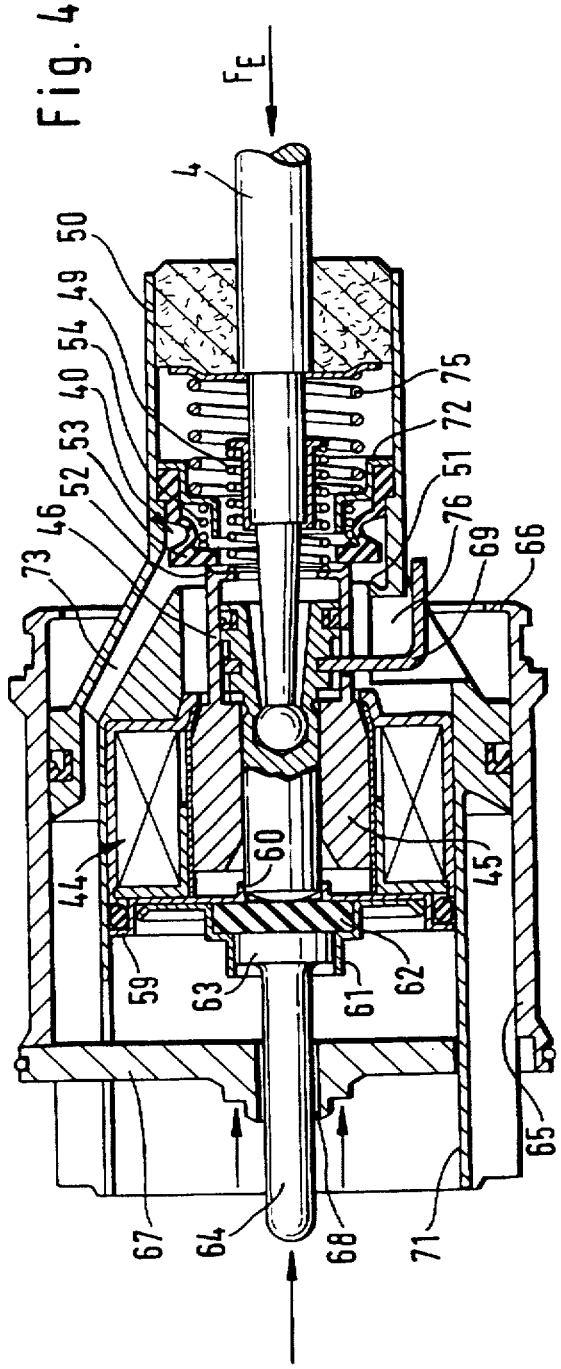
FIG. 4 shows a sectional view of pressure-reduction of the actuating unit according to the present invention during a pressure control.

As is shown in FIGS. 3 and 4, two pressure phases or states of actuation of the control valve 40 must be realized in the case of control. It is assumed that an actuating force $F_E$, which causes a displacement of the input member 4 or an opening of the atmospheric sealing seat 52 (with the vacuum sealing seat 51 closed), is initiated at the input member 4. The front end of the input member 4 comes into contact with the reaction disk 62 due to the action of a reaction power resulting from the pressure occurring in the main cylinder 2. The input member 4 partially enters into the reaction disk 62 during this contact and pretensions the reaction disk. If a tendency to locking is recognized at one of the wheels of the motor vehicle, during which the pressure set in the modulator space 7 is to be maintained at a constant value (pressure-holding phase), the electromagnet 44 is energized at a first energization level which leads to a displacement of its armature 45 and of the sleeve 46 connected thereto until the atmospheric sealing seat 52 comes into contact with the valve body 53, so that both control valve sealing seats 51, 52 are closed. The force generated by the electromagnet 44 must overcome only the force of the spring 49 pretensioning the sleeve 46 as well as the friction of the sealing site between the input member 4 and the sleeve 46. The switching state described is shown in FIG. 3.

If the central electronic control unit 33 recognizes during locking control that a phase of pressure reduction is necessary in the modulator space 7, a pneumatic pressure equalization must be initiated within the vacuum brake booster 1. A second energization level is applied for this purpose to the electromagnet 44, so that the force of the valve spring 54 pressing the valve body 53 onto the vacuum sealing seat 51 is additionally overcome and the vacuum sealing seat 51 is opened and rapid evacuation of the working chamber 38 can take place (see FIG. 4). As a result, the movable wall 17 of the brake booster 1 becomes de-energized and can be returned against the direction of actuation, while the control housing 50 stops, so that the pressure occurring in the modulator space 7 is released.

Figure 5:
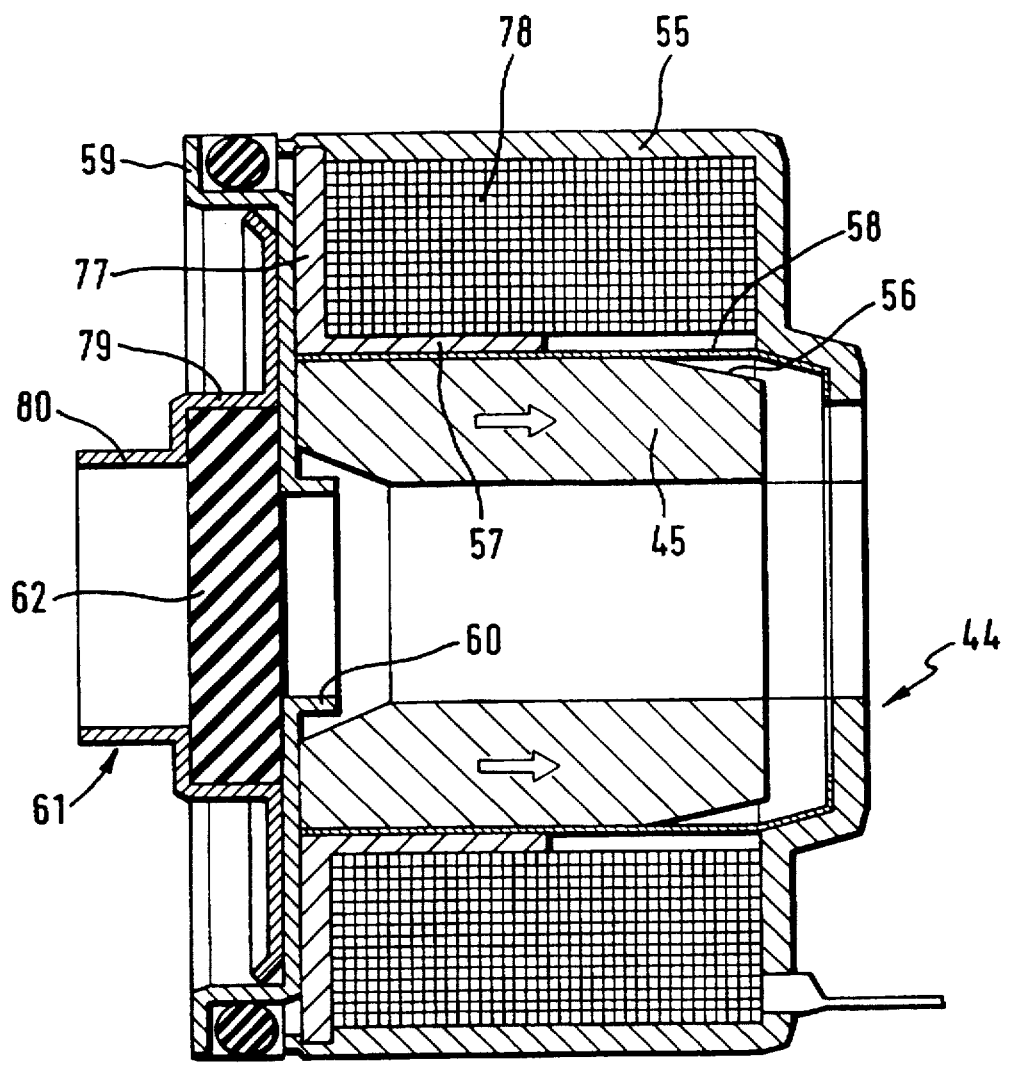
FIG. 5 shows the electromagnet used in the actuating unit according to FIGS. 2 through 4 on a larger scale.

Finally, FIG. 5 shows the design of the electromagnet 44 on a larger scale. As can be seen from the FIG. 5, the housing 55 of the electromagnet 44 is formed by a metal part prepared according to the deep-drawing process and has a conical shape in the pole area. A cylindrical yoke 57, which passes over into a radial annular surface 77, which, cooperating with the housing 55, is in contact with the winding 78 of the electromagnet 44, is used to radially guide the armature 45 of the electromagnet 44. The pole area of the housing 55, which is preferably designed as a so-called Jasse cone, cooperates with a truncated cone-shaped surface 56 provided on the armature 45, as a result of which an electromagnetic force that is proportional to the current is guaranteed in a defined stroke range. Inexpensive and effective mounting of the armature 45 is achieved especially if a low-friction film 58, which preferably extends into the conical pole area of the housing 55, is provided between the yoke 57 and the armature 45.

We claim:

1. An actuating unit for a locking-protected motor vehicle brake system comprising:

a control housing;

a pneumatic brake booster having:

(a) a housing, (b) a vacuum chamber, (c) a working chamber, and (d) a wall movable separately from the said control housing against the direction of actuation in the brake pressure control mode by a pneumatic pressure equalization initiated within the said booster housing;

a control valve;

an input member:

(a) extending through said control housing, (b) actuating said control valve, and (c) controlling a pneumatic pressure difference acting on said movable wall of the said brake booster; and a main brake cylinder downstream of said pneumatic brake booster and having:

(a) first pressure space, (b) a second pressure space, (c) a modulator space which:
  (1) in the normal braking mode is part of said first pressure space, and
  (2) in the brake pressure control mode is connected to wheel brakes separately from said first pressure space, (d) a first piston defining said first pressure space and having:
  (1) an inner part connected to said input member, and
  (2) an outer part modulator piston connected to said movable wall of said brake booster and defining said modulator space, and (e) a second piston defining said second pressure space.

2. An actuating unit in accordance with claim 1 wherein said pneumatic brake booster is a vacuum brake booster.

3. An actuating unit in accordance with claim 2 further including electromechanical means for reversing the said control valve to initiate pressure equalization.

4. An actuating unit in accordance with claim 3 wherein said control valve includes an atmospheric sealing seat and a sleeve carrying said atmospheric sealing seat and said electromechanical means include an electromagnet having an armature which cooperates with said sleeve of said control valve.

5. An actuating unit in accordance with claim 4:
(a) further including a spring, and
(b) wherein said sleeve is in axial contact with the said input member under pretension by said spring.

6. Actuating unit in accordance with claim 5 wherein:
(a) said control valve further includes a valve body and a vacuum sealing seat,
(b) said actuating unit further includes a valve spring which urges said valve body of said control valve into contact with said vacuum sealing seat of said control valve, and
(c) the pretension of said spring and frictional forces on said sleeve are overcome by energizing said electromagnet to a predetermined energization level in the brake pressure control mode, so that said sleeve comes into contact with said valve body of said control valve, while the pretension of said valve spring which urges said valve body of said control valve into contact with the said vacuum sealing seat of the said control valve is not overcome.

7. An actuating unit in accordance with claim 6 wherein said electromagnet is arranged in a cylindrical recess of said control housing:
(a) facing said vacuum chamber of said brake booster,
(b) coaxial with and surrounding said input member.

8. An actuating unit in accordance with claim 7 wherein said electromagnet has a housing of conical shape in the pole area and said armature has a truncated cone-shaped surface with which said housing of said electromagnet cooperates.

9. An actuating unit in accordance with claim 8 wherein said housing of said electromagnet is formed by a deep-drawing process and has a radially inner cylindrical yoke which guides said armature.

10. An actuating unit in accordance with claim 9 further including a said low-friction film between the said yoke and said armature and extending into the pole area of the said housing of said electromagnet.

11. An actuating unit in accordance with claim 10 further including means for holding said electromagnet in the said control housing, said holding means including a annular holding part having a guide shoulder for guiding said input member.

12. An actuating unit in accordance with claim 11 further including:
(a) a rubber-elastic reaction disk,
(b) a pressing rod having a head flange transmitting the initial force of the said brake booster and having a diameter smaller than the diameter of said reaction disk, and
(c) a centering ring accommodating said rubber-elastic reaction disk and said pressing rod and arranged within the said holding part.

13. An actuating unit in accordance with claim 12 further including a force-transmitting sleeve displaceable on said control housing and having a radial collar and wherein said movable wall is arranged on said force-transmitting sleeve, whereby boosting force is transmitted to said control housing in the normal braking mode.

14. An actuating unit in accordance with claim 13 further including a force-transmitting plate axially connected to said force-transmitting sleeve and through which boosting force is transmitted to said outer part modulator piston of said first main brake cylinder piston, said force-transmitting plate having a passage through which said pressing rod extends to cooperate with said inner part of said first main brake cylinder piston.

15. An actuating unit in accordance with claim 14 further including:
(a) a stop integral with said booster housing, and
(b) a cross member which contacts said stop member to limit return movement of said input member in the released position.

16. An actuating unit in accordance with claim 15 wherein said movable wall of said booster is movable beyond the released position in the brake pressure control mode.

17. An actuating unit in accordance with claim 16 wherein the ratio of the volume of said vacuum chamber of said brake booster to the volume of said working chamber of said brake booster in the released position of said brake booster is in the range of 10:1 to 15:1.

18. An actuating unit in accordance with claim 17 wherein said centering ring has cylindrical section which accommodates said head flange and has a diameter slightly larger than the diameter of said guide shoulder.

19. An actuating unit for a locking-protected motor vehicle brake system comprising:

a control housing;

a pneumatic brake booster having:
(a) a housing,
(b) a vacuum chamber,
(c) a working chamber, and (d) a wall movable separately from the said control housing against the direction of actuation in the brake pressure control mode by a pneumatic pressure equalization initiated within the said booster housing;

a plurality of wheel brakes associated with wheels of the vehicle to be braked;

a plurality of sensors for detecting the rotational behavior of the wheels of the vehicle;

a central electronic control unit responsive to said sensors;

a control valve;

an input member:

(a) extending through said control housing, (b) actuating said control valve, and (c) controlling a pneumatic pressure difference acting on said movable wall of the said brake booster; and a main brake cylinder downstream of said pneumatic brake booster and having:

(a) first pressure space, (b) a second pressure space, (c) a modulator space which:

(1) in the normal braking mode is part of said first pressure space, and (2) in the brake pressure control mode is connected to said wheel brakes separately from said first pressure space, (d) a first piston defining said first pressure space and having:

(1) an inner part connected to said input member, and (2) an outer part modulator piston connected to said movable wall of said brake booster and defining said modulator space, and (e) a second piston defining said second pressure space.

* * * * *